United States Patent
Lee

(10) Patent No.: US 10,830,171 B2
(45) Date of Patent: Nov. 10, 2020

(54) VEHICLE SENSOR OUTPUT PROCESSING

(71) Applicant: Ford Global Technologies, LLC, Dearborn, MI (US)

(72) Inventor: Tae-Kyung Lee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 902 days.

(21) Appl. No.: 15/050,968

(22) Filed: Feb. 23, 2016

(65) Prior Publication Data

US 2017/0241363 A1 Aug. 24, 2017

(51) Int. Cl.
*B60T 7/12* (2006.01)
*F02D 41/30* (2006.01)
*F02D 41/14* (2006.01)
*B60L 3/12* (2006.01)
*F02D 41/18* (2006.01)

(52) U.S. Cl.
CPC ............ *F02D 41/3005* (2013.01); *B60L 3/12* (2013.01); *F02D 41/1454* (2013.01); *F02D 41/182* (2013.01); *F02D 2041/1416* (2013.01); *F02D 2041/1424* (2013.01); *F02D 2041/1432* (2013.01)

(58) Field of Classification Search
CPC ............ F02D 41/3005; F02D 41/1454; F02D 41/182; F02D 2041/1416; F02D 2041/1424; F02D 2041/1432; B60L 3/12
USPC .......................................................... 701/103
See application file for complete search history.

(56) References Cited

U.S. PATENT DOCUMENTS

| 4,009,450 | A | * | 2/1977 | Holcomb | ................ | H03L 7/081 |
| | | | | | | 331/17 |
| 5,544,639 | A | * | 8/1996 | Shouda | ................... | F01N 9/005 |
| | | | | | | 123/676 |
| 5,920,617 | A | * | 7/1999 | Berger | ...................... | G01K 7/42 |
| | | | | | | 123/406.55 |
| 6,581,374 | B2 | * | 6/2003 | Patchett | ................. | B01D 53/90 |
| | | | | | | 60/286 |
| 7,930,147 | B2 | * | 4/2011 | Tuken | ...................... | G01D 3/02 |
| | | | | | | 123/679 |
| 8,489,666 | B1 | * | 7/2013 | Nikitin | ................. | G06G 7/1928 |
| | | | | | | 708/819 |
| 8,935,043 | B2 | | 1/2015 | Li et al. | | |
| 9,043,106 | B2 | * | 5/2015 | Ingram | ................. | B60W 20/12 |
| | | | | | | 701/416 |

(Continued)

FOREIGN PATENT DOCUMENTS

EP 1168118 A1 1/2002

OTHER PUBLICATIONS https://www.mathworks.com/discovery/low-pass-filter.html, Aug. 15, 2014 (Year: 2014).*

(Continued)

Primary Examiner — Hung Q Nguyen
Assistant Examiner — Anthony Donald Taylor, Jr.
(74) Attorney, Agent, or Firm — David Kelley; Brooks Kushman, P.C.

(57) ABSTRACT

A vehicle control system includes a processor programmed to control a vehicle subsystem according to a recovered signal generated from an output signal of a sensor, and a product of a time constant of the sensor and filtered changes of the output signal with respect to time such that a magnitude and phase of the recovered signal approach a magnitude and phase of an input signal to the sensor.

20 Claims, 4 Drawing Sheets

(56) References Cited

U.S. PATENT DOCUMENTS

| | | | | |
|---|---|---|---|---|
| 9,467,113 | B2* | 10/2016 | Nikitin | H03H 7/0153 |
| 2012/0235483 | A1* | 9/2012 | Rigby | H01M 10/482 |
| | | | | 307/29 |
| 2017/0131123 | A1* | 5/2017 | Pedrami | G01D 18/00 |

OTHER PUBLICATIONS

Criens, C.H.A., Air-Path Control of Clean Diesel Engines for Disturbance Rejection on NOx, PM and Fuel Efficiency, (2013) 200 pp., The Netherlands.

* cited by examiner

VEHICLE SENSOR OUTPUT PROCESSING

TECHNICAL FIELD

The present disclosure relates to systems and methods for controlling a vehicle subsystem according to a recovered signal generated from an output of a sensor.

BACKGROUND

A vehicle may include a plurality of vehicle subsystems associated with vehicle operation, such as an air conditioning subsystem, a propulsion subsystem, an exhaust subsystem, a brake subsystem, a steering subsystem, a fuel injection subsystem, and so on. The vehicle subsystem may comprise one or more components including circuitry, hardware, and software components, such as valves, pipes, hoses, clamps, injectors, pumps, controllers, logic gates, passive and active semiconductor devices, and so on. Sensors may be used to monitor these components.

SUMMARY

A vehicle control system includes a processor programmed to control a vehicle subsystem according to a recovered signal generated from an output signal of a sensor, and a product of a time constant of the sensor and filtered changes of the output signal with respect to time such that a magnitude and phase of the recovered signal approach a magnitude and phase of an input signal to the sensor.

A vehicle system controller includes input channels configured to receive an output signal of a sensor, output channels configured to control a vehicle subsystem according to a recovered signal, and control logic configured to generate the recovered signal from the output signal, and a product of a time constant of the sensor and filtered changes of the output signal with respect to time such that a magnitude and phase of the recovered signal approach a magnitude and phase of an input signal to the sensor.

A method includes controlling by a processor a vehicle subsystem according to a recovered signal generated from an output signal of a sensor, and a product of a time constant of the sensor and filtered changes of the output signal with respect to time such that a magnitude and phase of the recovered signal approach a magnitude and phase of an input signal to the sensor.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
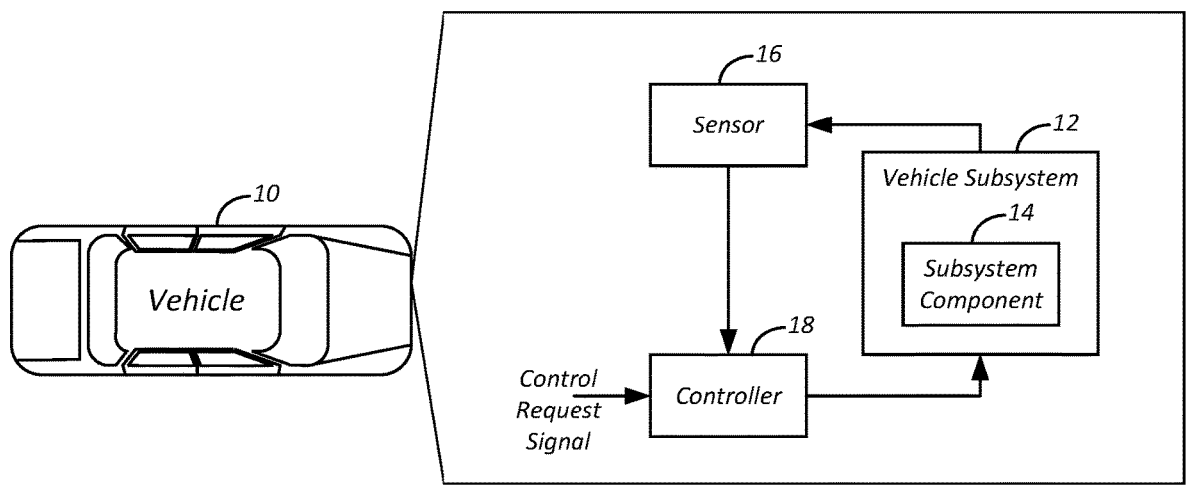
FIG. 1 is a block diagram of a vehicle illustrating a vehicle control system including a processor for controlling a vehicle subsystem according to an output signal of a sensor.

Referring to FIG. 1, a vehicle 10 having a vehicle subsystem 12 is shown. The vehicle subsystem 12 may be a subsystem associated with vehicle operation, such as, but not limited to, an air conditioning subsystem, a high-voltage battery cooling subsystem, a propulsion subsystem, an exhaust subsystem, a brake subsystem, a steering subsystem, a fuel injection subsystem, and so on. The vehicle subsystem 12 may comprise one or more subsystem components 14 including circuitry, hardware, and software components, such as, but not limited to, valves, pipes, hoses, clamps, injectors, pumps, controllers, logic gates, passive and active semiconductor devices, and so on.

In one example, the vehicle subsystem 12 may be a fuel injection subsystem and the subsystem component 14 may be a fuel injector. In another example, the vehicle subsystem 12 may be an exhaust subsystem and the subsystem component 14 may be an exhaust valve. In yet another example, the vehicle subsystem 12 may be an air conditioning subsystem and the subsystem component 14 may be a coolant valve. In another example, the vehicle subsystem 12 may be a high-voltage battery cooling subsystem and the subsystem component 14 may be a battery coolant valve.

A sensor 16 may be configured to monitor one or more operating parameters associated with (or variables indicative of one or more states of) the vehicle subsystem 12 and/or the one or more subsystem components 14. In one example, the sensor 16 may be a contact or a noncontact type sensor, such as, but not limited to, a thermocouple. In such an example, the sensor 16 may be configured to measure, for example, but not limited to, temperature of fuel in the fuel injection subsystem, temperature of exhaust gas in the exhaust subsystem, or temperature of coolant in the air conditioning subsystem, or temperature of coolant in the high-voltage battery cooling subsystem, and so on. In another example, the sensor 16 may be a sensor such as, but not limited to, a nitrogen-oxide (NOx) sensor, an oxygen ($O_2$) sensor, and so on.

A controller 18 may be electrically connected to the sensor 16. The controller 18 may be configured to receive an output signal from the sensor 16 indicative of a measured operating parameter associated with the vehicle subsystem 12 and/or the one or more subsystem components 14, e.g., temperature, nitrogen-oxide level, oxygen level, and so on. The controller 18 may be configured to, in response to receiving a control request, control the vehicle subsystem 12 and/or the one or more subsystem components 14 based on the received signal from the sensor 16 indicative of a measured operating parameter. In one example, in response to a control request, the controller 18 may control a valve position, fluid level, air flow level, fuel injection amount, and so on of the vehicle subsystem 12 and/or the one or more subsystem components 14 based on the received signal indicative of a measured operating parameter.

The sensor 16 may have one or more predetermined operating characteristics, such as, but not limited to, operating range, sensitivity, resolution, dynamic response, linearity, hysteresis, accuracy, and so on. The operating characteristics of the sensor 16 may be influenced by one or more factors, such as, but not limited to, sensor design, material, and manufacturing methods. The dynamic characteristics of the sensor 16 may include transient response of the sensor 16 to an input change. The transient response of the sensor 16 to the input change may be a function of, for example, heat transfer coefficient, thermal conductivity, and other attributes of the sensor 16. In one example, as described in further detail in reference to FIG. 2, dynamic characteristics of the sensor 16 may cause an output signal of the sensor 16, i.e., a sensed signal $\bar{y}$, to have a reduced magnitude and/or a phase shift relative to the sensor input signal y.

Figure 2A:
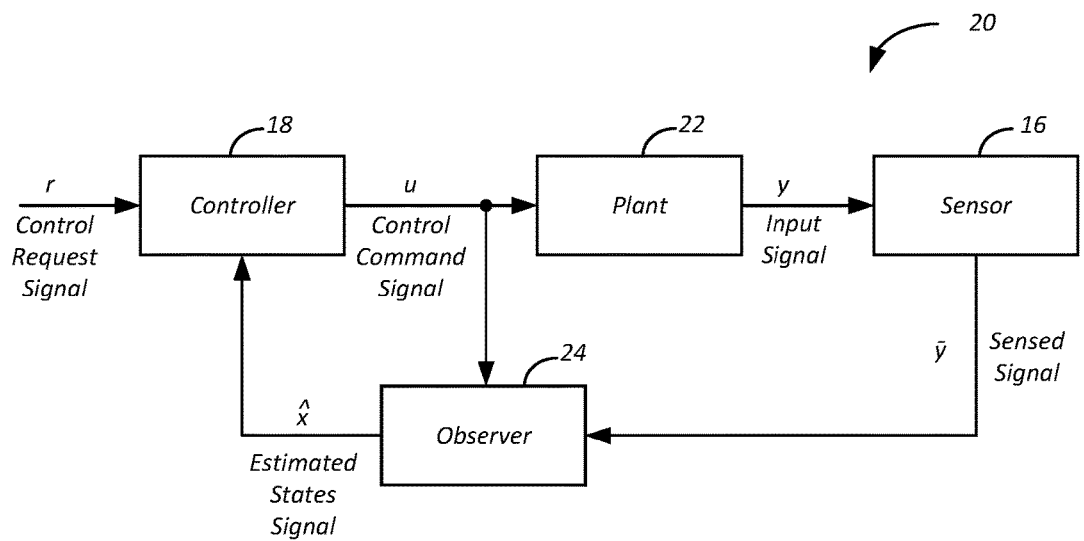
FIGS. 2A-2B are block diagrams illustrating a vehicle control system including a sensor.

Referring now to FIG. 2A, an example control system 20 for the vehicle 10 is shown. The control system 20 may be a feedback control system or another type of control system that uses a measured value of a variable to control the variable such that, for example, the variable achieves a predetermined value. The control system 20 includes the sensor 16 configured to monitor an example vehicle subsystem 22 (hereinafter, plant 22). The sensor 16 is configured to sense a change in one or more operating parameters associated with the plant 22 and transmit a signal, e.g., a sensed signal $\bar{y}$, indicative of the sensed change in a value of the one or more operating parameters. The controller 18 is configured to control the plant 22 (and/or one or more components of the plant 22) based on the sensed signal $\bar{y}$ in response to receiving a control request signal r.

The control system 20 may utilize an observer 24 designed based on various control theories when one or more state variables $\hat{x}$ are not available for feedback. The observer 24 may receive from the sensor 16 a signal indicative of the sensed change in the responses of the plant 22, e.g., a sensed signal $\bar{y}$. The observer 24 may further receive from the controller 18 a control command signal u, i.e., a control input. The observer 24 may be configured to generate an estimate of the output signal y of the plant 22, e.g., an estimated state signal $\hat{x}$, based on the received sensed signal $\bar{y}$ and the received control command signal u. The observer 24 may be further configured to transmit the estimated state signal $\hat{x}$ to the controller 18. The controller 18 may be configured to generate the control signal to the plant 22, e.g., by transmitting a control command signal u, based on the received estimated state signal $\hat{x}$ from the observer 24 in response to receiving a control request signal r. While the control system 20 includes the observer 24, in one example, the controller 18 may be configured to control the plant 22 based on the sensed signal $\bar{y}$.

In one example, the sensor 16 may be a thermocouple. Thermocouple may be a thermoelectric sensor that includes two junctions of dissimilar metals and/or metal alloys, such as iron, copper, constantan, and so on. The two junctions may be welded or crimped together, and may have a constant voltage potential difference, e.g., a few millivolts (mV). A first junction may be a reference (cold) junction and may be kept at a constant temperature. A second junction may be a measuring (hot) junction. A voltage resulting across the junctions due to a thermoelectric effect may be a function of temperature changes and may thus be used to measure temperature.

Figure 2B:
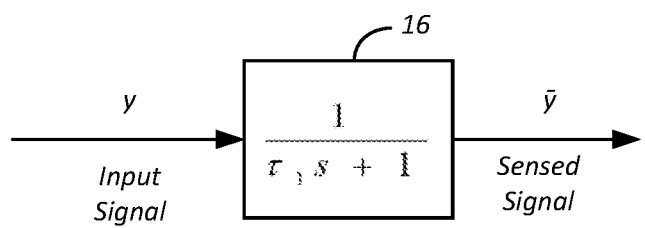

Shown in FIG. 2B is a block diagram of the sensor 16 generating an output signal, e.g., a sensed signal $\bar{y}$, in response to receiving input signal y. A dynamic response of the sensor 16 may be a change in the sensed signal $\bar{y}$ in response to a change in the input signal y. The dynamic response of the sensor 16 may be represented using at least one of a zero-, first-, and second-order systems and represented in mathematical terms using at least one of a zero-, first-, and second-order differential equations. In one example, the dynamic response of the sensor 16, e.g., a thermocouple, may be represented as a first-order low-pass filter and expressed in Laplace domain as:

$$\frac{\bar{y}}{y} = \frac{1}{\tau_1 s + 1};$$

where $\tau_1$ is a time constant of the sensor 16 and s is a Laplace domain variable, which can be expressed as a complex variable $s = \alpha + j\omega$. The time constant $\tau_1$ characterizes the response of the sensor 16 to a step input of a first-order, linear time-invariant (LTI) system, and may be identified based on test data of the sensor 16 or other available measurements.

Figure 2C:
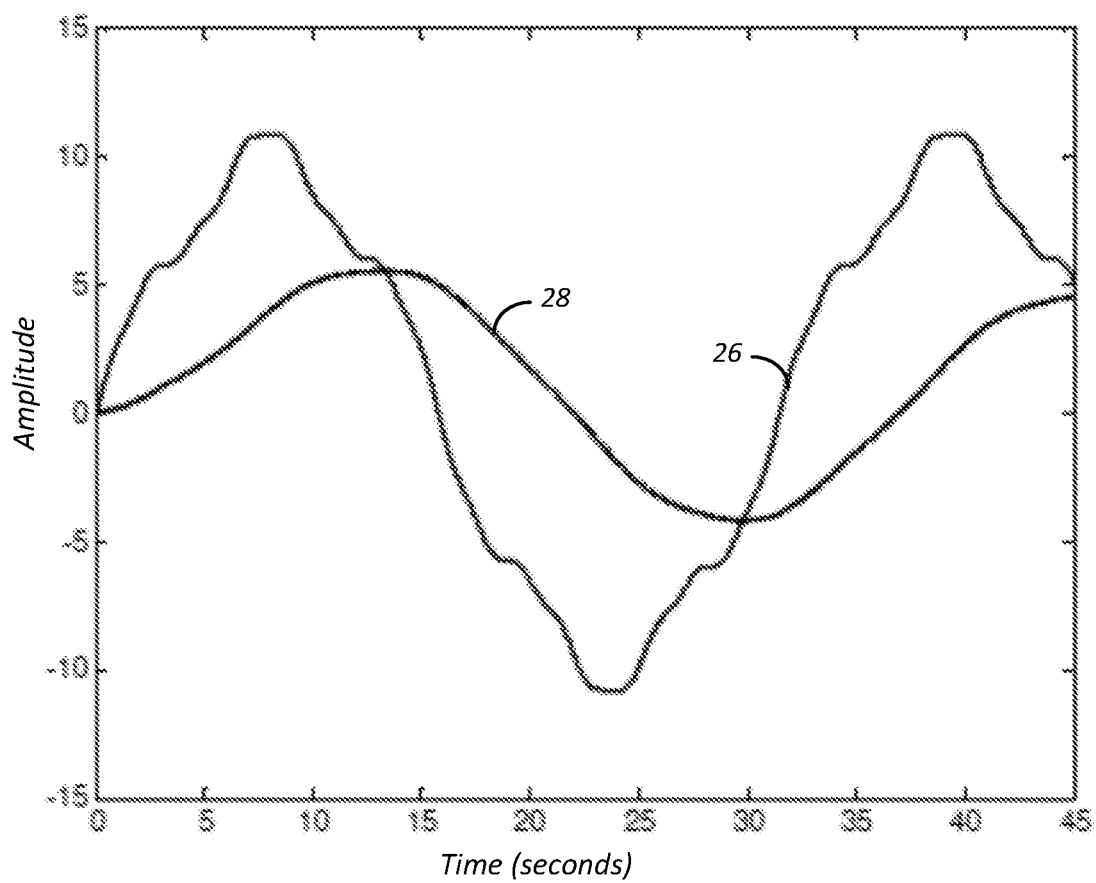
FIG. 2C is a graph illustrating an output of a sensor having a slow dynamic response.

The sensor 16, e.g., a thermocouple, may be characterized by a slow dynamic response, i.e., may respond slowly to a rapid input change. In one example, the sensor 16 generating the sensed signal $\bar{y}$ may not capture one or more frequency components of the sensor input signal y outside a bandwidth of the sensor 16. In such an example, a magnitude and phase of the example sensed signal $\bar{y}$ 28 may be different from a magnitude and phase of the example sensor input signal y 26. Shown in FIG. 2C is a time-domain graph of an example sensed signal $\bar{y}$ 28 the sensor 16 having a slow dynamic response may generate (output) in response to receiving an example sensor input signal (plant output signal) y 26. The example sensed signal $\bar{y}$ 28 generated by the sensor 16 has a reduced amplitude and/or has a phase shift with respect to that of the example sensor input signal y 26.

Figure 3A:
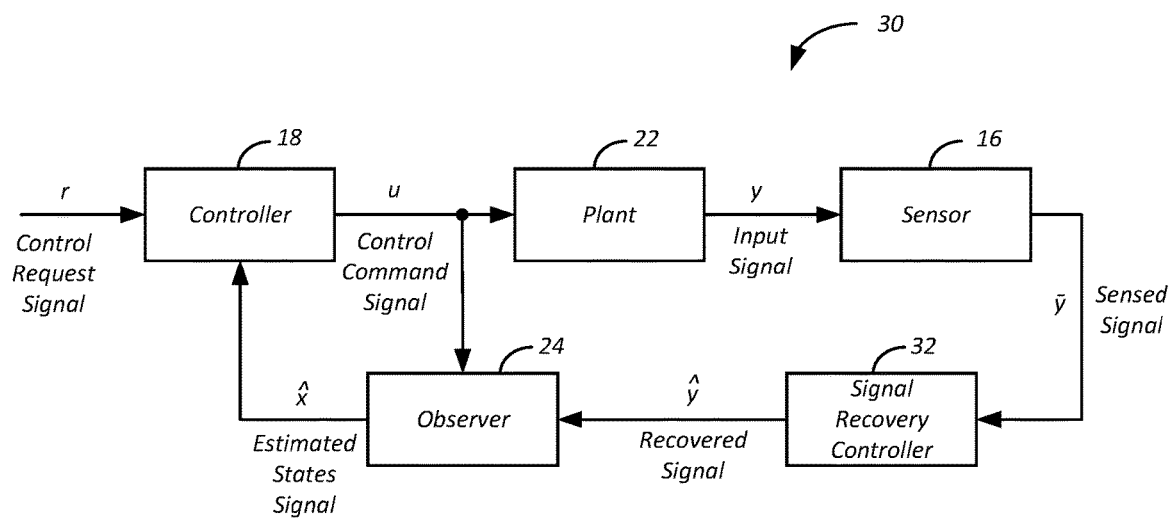
FIGS. 3A-3B are block diagrams illustrating a vehicle control system having a signal recovery controller.

Referring to FIG. 3A, an example processing system 30 for processing a slow dynamics sensor output of the sensor 16 is shown. The example processing system 30 includes a signal recovery controller 32 configured to receive a sensed signal $\bar{y}$. The signal recovery controller 32 may be configured to generate a recovered signal (e.g., observer input signal) $\hat{y}$ from the received sensed signal $\bar{y}$. The recovered signal $\hat{y}$ generated by the signal recovery controller 32 may be a signal indicative of a sensor input signal y. In one example, a magnitude and phase of the recovered signal $\hat{y}$ may be approaching a magnitude and phase of the sensor input signal y.

Figure 3B:
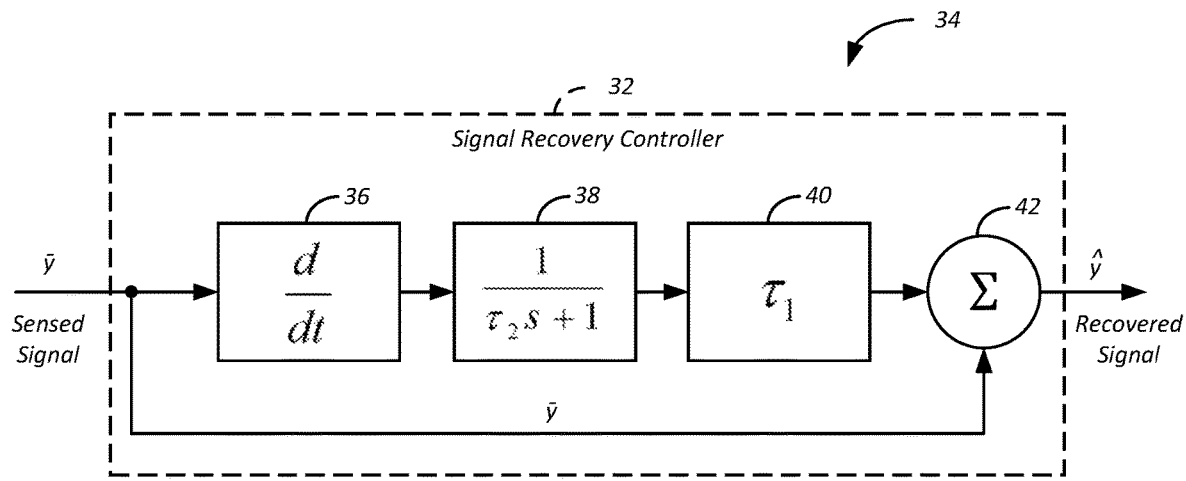

The signal recovery controller 32 may be configured to perform one or more signal processing operations to generate a recovered signal $\hat{y}$ from the received sensed signal $\bar{y}$. Shown in FIG. 3B is a block diagram illustrating the signal recovery controller 32 for generating a recovered signal $\hat{y}$ indicative of a sensor input signal y. As shown at block 36 the signal recovery controller 32 may be configured to receive a sensed signal $\bar{y}$ and to generate a differentiated signal $\dot{\bar{y}}$ of the received sensed signal $\bar{y}$ with respect to time. In one example, the signal recovery controller 32 may generate the differentiated signal $\dot{\bar{y}}$ by taking a derivative of the received sensed signal $\bar{y}$, i.e., by determining a slope of a tangent function at one or more predetermined points of the received sensed signal $\bar{y}$.

The signal recovery controller 32 may be configured to filter a differentiated signal $\bar{\dot{y}}$, as shown at block 38. In one example, the signal recovery controller 32 may filter a differentiated signal by $\bar{\dot{y}}$ by applying an n-order transfer function defined in a Laplace transform, or using other expressions defined from z-transform, discrete Fourier transform, and so on. In one example, the transfer function may be an n-order filter, having different characteristics, such as, but not limited to, low-pass, high-pass, band-pass, band-stop characteristics, and so on.

The signal recovery controller 32 may be configured to, as shown at block 40, multiply a dynamic response profile of a differentiated signal $\bar{\dot{y}}$ by a time constant $\tau_1$. The time constant $\tau_1$ may be a time constant of the sensor 16, however using one or more other constants to compensate for any model discrepancy in characterizing the sensor 16 is also contemplated.

As shown at block 42, the signal recovery controller 32 may be configured to generate a recovered signal $\hat{y}$ from a sum of a product of the time constant $\tau_1$ and a filtered differentiated signal $\bar{\dot{y}}$, and the sensed signal $\bar{y}$. The recovered signal $\hat{y}$ generated by the signal recovery controller 32 may be a signal indicative of a sensor input signal y. In one example, a magnitude and phase of the recovered signal $\hat{y}$ generated by the signal recovery controller 32 may approach a magnitude and phase of a sensor input signal y.

Figure 3C:
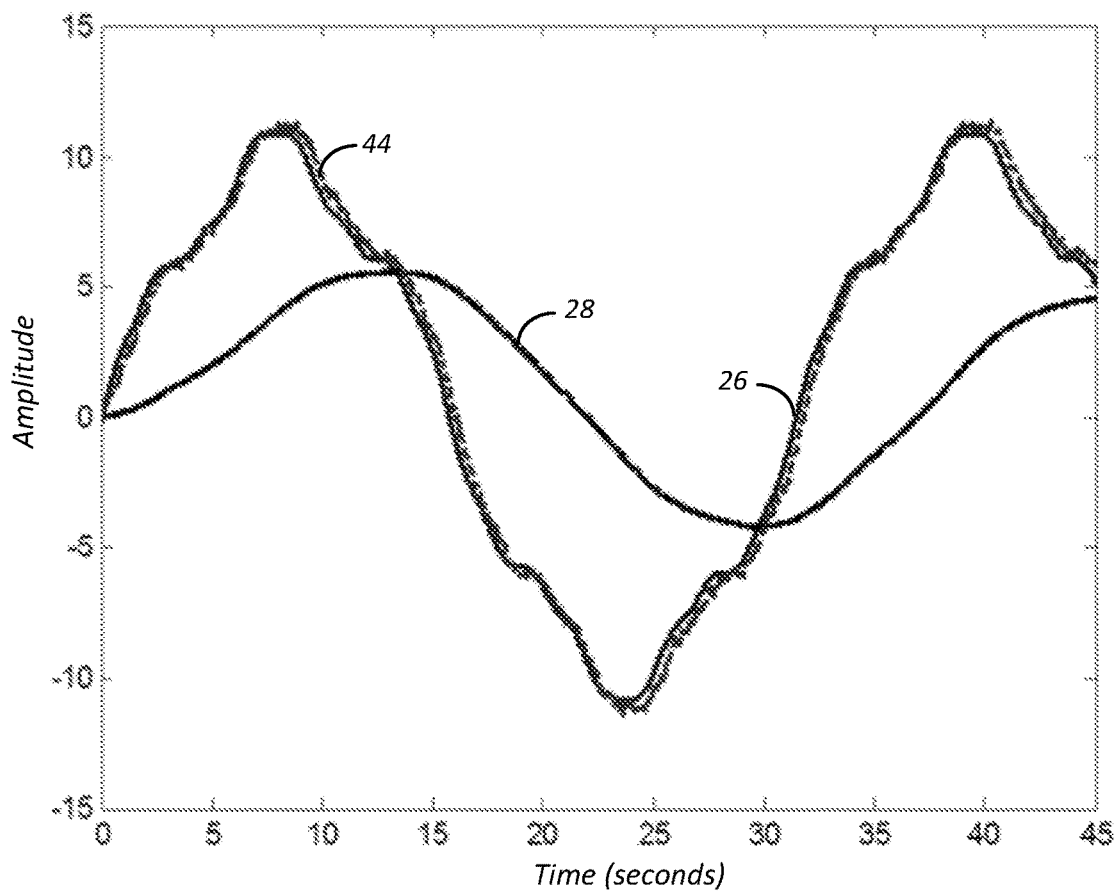
FIG. 3C is a graph illustrating a recovered signal generated by the signal recovery controller based on an output of a sensor having a slow dynamic response.

Referring to FIG. 3C, a time-domain graph of an example recovered signal $\hat{y}$ 44 the signal recovery controller 32 may generate in response to receiving the example sensed signal $\bar{y}$ 28. As shown in FIG. 3C, the example recovered signal $\hat{y}$ 44 is a more accurate representation of the example sensor input signal y 26 than the example sensed signal $\bar{y}$ 28, i.e., a magnitude and phase of the example recovered signal $\hat{y}$ 44 generated by the signal recovery controller 32 approach a magnitude and phase of the example sensor input signal y 26 closer than a magnitude and phase of the example sensed signal $\bar{y}$ 28.

Figure 4:
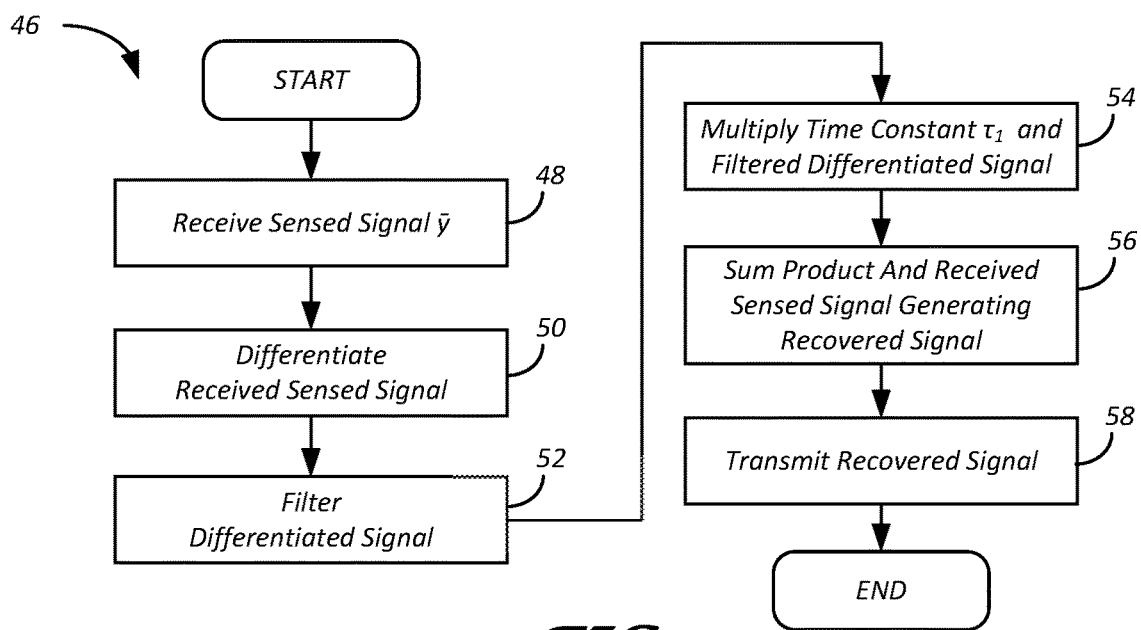
FIG. 4 is a flowchart illustrating an algorithm for generating a recovered signal according to an output of a sensor having a slow dynamic response.

In reference to FIG. 4, a signal recovery process 46 is shown. The signal recovery process 46 may begin at block 48 where the signal recovery controller 32 receives the sensed signal $\bar{y}$, i.e., the sensor output signal. In one example, the sensed signal $\bar{y}$ may be a signal generated by the sensor 16 having slow dynamics in response to receiving a sensor input signal (plant output signal) y.

At block 50 the signal recovery controller 32 differentiates the received sensed signal $\bar{y}$ to generate a differentiated signal $\bar{\dot{y}}$. In one example, the signal recovery controller 32 may generate the differentiated signal $\bar{\dot{y}}$ by taking a derivative of the received sensed signal $\bar{y}$ with respect to time, i.e., by determining a slope of a tangent function of the received sensed signal $\bar{y}$ at one or more predetermined time steps.

The signal recovery controller 32 filters the differentiated signal $\bar{\dot{y}}$ at block 52. In one example, the signal recovery controller 32 may apply a transfer function, such as, but not limited to, a first-order transfer function, to the differentiated signal $\bar{\dot{y}}$. The signal recovery controller 32 may use a transfer function defined using a Laplace transform, or use other expressions defined using transforms such as, but not limited to, z-transform, discrete Fourier transform, and so on. In one example, the transfer function may represent an n-order analog or a digital system, such as, but not limited to, an n-order low-pass, high-pass, band-pass, band-stop system, and so on.

The signal recovery controller 32, at block 54, multiplies the filtered differentiated signal $\bar{\dot{y}}$ by a time constant $\tau_1$. The time constant $\tau_1$ may be a time constant of the sensor 16, however using one or more other constants to compensate for any model discrepancy in characterizing the sensor 16 is also contemplated. At block 56 the signal recovery controller 32 sums the sensed signal $\bar{y}$ and the product of the filtered differentiated signal $\bar{\dot{y}}$ and a time constant $\tau_1$ generating a recovered signal $\hat{y}$. The recovered signal $\hat{y}$ generated by the signal recovery controller 32 may be indicative of a sensor input signal y, such that a magnitude and phase of the recovered signal $\hat{y}$ may approach a magnitude and phase of the sensor input signal y.

At block 58 the signal recovery controller 32 transmits the generated recovered signal $\hat{y}$ to the observer 24. The observer 24 may generate an estimated state signal $\hat{x}$ in response to receiving the generated recovered signal $\hat{y}$ and the control command signal u. In one example, the signal recovery controller 32 transmits the recovered signal $\hat{y}$ to a subsystem controller that issues a control command controlling a vehicle subsystem and/or one or more components of the vehicle subsystem. At this point the signal recovery process 46 may end. In one example, the signal recovery process 46 may be repeated in response to receiving a sensed signal $\bar{y}$ or in response to another signal or request.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle control system comprising:
a processor programmed to control a vehicle subsystem according to a recovered signal generated from a sum of an actual output signal of a sensor and a product of a time constant of the sensor and filtered changes of the output signal with respect to time such that a magnitude and phase of the recovered signal approach a magnitude and phase of an actual input signal to the sensor.

2. The system of claim 1, wherein the sensor is a slow dynamic response sensor.

3. The system of claim 2, wherein the slow dynamic response sensor is a temperature sensor and wherein controlling the vehicle subsystem includes controlling a high-voltage battery cooling subsystem.

4. The system of claim 2, wherein the slow dynamic response sensor is an oxygen sensor and wherein controlling the vehicle subsystem includes controlling a fuel injection subsystem.

5. The system of claim 1, wherein the filtered changes result from application of a low-pass filter to changes of the output signal.

6. The system of claim 1, wherein a first difference between the magnitude and phase of the recovered signal and the magnitude and phase of the input signal to the sensor is less than a second difference between the magnitude and phase of the input signal and a magnitude and phase of the output signal.

7. The system of claim 1, wherein the magnitude and phase of the recovered signal and the magnitude and phase of the input signal to the sensor are the same.

8. A vehicle system controller comprising:
input channels configured to receive an actual output signal of a sensor;
output channels configured to control a vehicle subsystem according to a recovered signal; and
control logic configured to generate the recovered signal from a sum of the output signal and a product of a time constant of the sensor and filtered changes of the output signal with respect to time such that a magnitude and phase of the recovered signal approach a magnitude and phase of an actual input signal to the sensor.

9. The controller of claim 8, wherein the sensor is a slow dynamic response sensor.

10. The controller of claim 9, wherein the slow dynamic response sensor is a temperature sensor and wherein controlling the vehicle subsystem includes controlling a high-voltage battery cooling subsystem.

11. The controller of claim 9, wherein the slow dynamic response sensor is an oxygen sensor and wherein controlling the vehicle subsystem includes controlling a fuel injection subsystem.

12. The controller of claim 8, wherein the filtered changes result from application of a low-pass filter to changes of the output signal.

13. The controller of claim 8, wherein a first difference between the magnitude and phase of the recovered signal and the magnitude and phase of the input signal to the sensor is less than a second difference between the magnitude and phase of the input signal and a magnitude and phase of the output signal.

14. The controller of claim 8, wherein the magnitude and phase of the recovered signal and the magnitude and phase of the input signal to the sensor are the same.

15. A method comprising:
controlling by a processor a vehicle subsystem according to a recovered signal generated from a sum of an actual output signal of a sensor and a product of a time constant of the sensor and filtered changes of the output signal with respect to time such that a magnitude and phase of the recovered signal approach a magnitude and phase of an actual input signal to the sensor.

16. The method of claim 15, wherein the sensor is a slow dynamic response sensor.

17. The method of claim 16, wherein the slow dynamic response sensor is a temperature sensor and wherein controlling the vehicle subsystem includes controlling a high-voltage battery cooling subsystem.

18. The method of claim 16, wherein the slow dynamic response sensor is an oxygen sensor and wherein controlling the vehicle subsystem includes controlling a fuel injection subsystem.

19. The method of claim 15, wherein the filtered changes result from application of a low-pass filter to changes of the output signal.

20. The method of claim 15, wherein a first difference between the magnitude and phase of the recovered signal and the magnitude and phase of the input signal to the sensor is less than a second difference between the magnitude and phase of the input signal and a magnitude and phase of the output signal.

* * * * *